(12) United States Patent
Kim et al.

(10) Patent No.: US 8,505,167 B2
(45) Date of Patent: Aug. 13, 2013

(54) PORTABLE TERMINAL HAVING A HINGE APPARATUS

(75) Inventors: Won-Tae Kim, Gyeonggi-do (KR);
Sang-Joon Park, Seoul (KR);
Jong-Woo Kim, Gyeonggi-do (KR);
Seok-Gyu Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 465 days.

(21) Appl. No.: 12/815,468

(22) Filed: Jun. 15, 2010

(65) Prior Publication Data

US 2011/0023270 A1 Feb. 3, 2011

(30) Foreign Application Priority Data

Jul. 30, 2009 (KR) .................. 10-2009-0069811

(51) Int. Cl.
*E05D 11/10* (2006.01)
*E05F 1/08* (2006.01)

(52) U.S. Cl.
USPC .............. 16/326; 16/329; 16/374; 16/307; 16/239; 16/303; 16/330

(58) Field of Classification Search
USPC ............... 16/297, 299, 335, 337, 339, 355, 16/357, 360, 374, 286, 307, 308; 361/679.08, 361/679.11, 679.02, 679.15, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| | | | |
|---|---|---|---|
| 7,146,195 B2* | 12/2006 | Sudo et al. ................ | 455/575.1 |
| 7,287,302 B2* | 10/2007 | Park et al. .................. | 16/330 |
| 7,529,571 B2* | 5/2009 | Byun et al. ................ | 455/575.4 |
| 7,866,000 B2* | 1/2011 | Lee et al. ................... | 16/334 |
| 7,987,559 B2* | 8/2011 | Chou .......................... | 16/367 |
| 2005/0091795 A1* | 5/2005 | Jeong et al. ................ | 16/303 |
| 2005/0150081 A1* | 7/2005 | Gan .............................. | 16/367 |
| 2005/0202856 A1* | 9/2005 | Park et al. ................. | 455/575.1 |
| 2005/0221874 A1* | 10/2005 | Cho et al. .................. | 455/575.4 |
| 2006/0218750 A1* | 10/2006 | Tajima ........................ | 16/367 |
| 2006/0230579 A1* | 10/2006 | Ko et al. ..................... | 16/330 |
| 2007/0039135 A1* | 2/2007 | Duan et al. ................. | 16/330 |
| 2008/0078061 A1* | 4/2008 | Hsu et al. ................... | 16/367 |

* cited by examiner

*Primary Examiner* — Chuck Y. Mah
(74) *Attorney, Agent, or Firm* — Cha-Reiter, LLC

(57) ABSTRACT

Provided is a portable terminal including a first housing, a second housing, and a hinge apparatus rotatably coupling the first housing and the second housing. The hinge apparatus includes a hinge housing fixed to the first housing, a hinge member fixed to the second housing and coupled to the hinge housing, the hinge member rotating around a hinge axis which extends perpendicular to a surface of the first housing, an interference protrusion provided on one of the hinge housing and the hinge member, and a stopper groove formed in the other of the hinge housing and the hinge member wherein the hinge member rotates around the hinge axis while being spaced apart from the hinge housing.

19 Claims, 10 Drawing Sheets

PORTABLE TERMINAL HAVING A HINGE APPARATUS

CLAIM OF PRIORITY

This application claims, pursuant to 35 U.S.C. §119(a), priority to, and the benefit of the earlier filing date, of the Korean Patent Application, entitled "Portable Terminal having Hinge Apparatus," filed in the Korean Intellectual Property Office on Jul. 30, 2009 and assigned Serial No. 2009-69811, the entire disclosure of which is hereby incorporated by reference.

BACKGROUND OF THE INVENTION

1. Field of the Invention

The present invention relates to the field of portable terminals, and more particularly, to a portable terminal having a hinge apparatus which couples a pair of housings to each other such that the pair of housings can rotate while facing each other.

2. Description of the Related Art

Generally, a "portable terminal" is an electronic apparatus that provides wireless communication between users or between users and service providers. Mobile communication services using portable terminals have been limited to voice communication and short text transmission services in the initial stage of development, but they are rapidly expanding and now include multimedia services such as online games and video-on-demand services, and data services such as transmission of moving picture files/music files.

Portable terminals may be classified as bar-type terminals, flip-type terminals, and folder-type terminals according to their appearance. In a bar-type terminal, input devices such as a keypad and a transmitting unit (or mouthpiece) and output devices such as a display device and a receiving unit (or earpiece) are mounted in a single housing. In a flip-type terminal, a flip cover is rotatably mounted to prevent malfunctioning of input devices that may occur due to mounting of input/output devices in a single housing. In a folder-type terminal, two housings sections are coupled such that they rotate toward or away from each other while facing each other. Input devices and output devices are separately disposed in the housings, thereby facilitating the use of the terminal and making it easy to carry the terminal in a folded state.

In addition, a sliding-type terminal is opened and closed by a linear movement of a pair of housings facing each other, while a swing-type terminal is opened and closed by rotation of a pair of housings facing each other. A folder-type terminal is opened and closed by a movement of a front with respect to a rear surface. A rotary-type terminal combines the opening/closing operations of a folder-type terminal with the opening/closing operations of a swing-type terminal. This type of terminal meets various user preferences.

U.S. patent application Ser. No. 10/287,148 filed on Nov. 4, 2002 (issued as U.S. Pat. No. 7,200,409) by the present applicant discloses a swing-type terminal in which two housings are coupled to rotate while facing each other, and a hinge apparatus thereof. The hinge apparatus of the swing-type terminal includes a first hinge base and a second hinge base having a hinge shaft which is rotatably coupled to the first hinge base through a hinge hole of the first hinge base. An engagement means such as an E-ring is coupled to an outer circumferential surface of the hinge shaft.

The hinge apparatus of the swing-type terminal includes a body portion from which the hinge shaft extends, the body portion being fixed to a housing, and a rotating portion fixed to the other housing and rotatably coupled to a shaft of the body portion. The body portion and the rotating portion are prevented from being separated by using engagement means such as an E-ring and a snap ring.

However, conventional portable terminals performing swing operations may produce unpleasant noise due to interference between housings during rotation of the housings with respect to each other, and may suffer from damage to the exteriors of the housings due to a scratch or the like. Moreover, if a foreign substance is introduced between the housings, the exterior damage due to a scratch or the like worsens.

SUMMARY OF THE INVENTION

Accordingly, an aspect of the present invention is to provide a hinge apparatus capable of preventing damage to the exteriors of housings of a portable terminal due to a scratch while performing a swing operation.

Moreover, another aspect of the present invention is to provide a hinge apparatus capable of facilitating operation of a portable terminal to be opened or to be closed by a swing operation.

Furthermore, another aspect of the present invention is to provide a hinge apparatus capable of stably fixing housings when the housings overlap each other (closed) or are away from each other (open) in a portable terminal by a swing operation.

According to an aspect of the present invention, there is provided a portable terminal including a first housing, a second housing coupled to the first housing to rotate while facing the first housing, and a hinge apparatus rotatably coupling the first housing and the second housing, the hinge apparatus including a hinge housing fixed to the first housing, a hinge member fixed to the second housing and coupled to the hinge housing, the hinge member rotating around a hinge axis which extends perpendicular to a surface of the first housing, an interference protrusion provided on one of the hinge housing and the hinge member, and a stopper groove formed in the other of the hinge housing and the hinge member, in which when the first housing overlaps the second housing, the interference protrusion is engaged with the stopper groove and is interfered by the hinge member upon leaving the stopper groove, such that the hinge member rotates around the hinge axis while being spaced apart from the hinge housing.

The hinge apparatus may further include an elastic member for providing a drive force for rotating the hinge member in a direction, wherein the second housing rotates in the direction of the drive force.

The hinge apparatus may further include a guide shaft extending along the hinge axis and being formed in the hinge member and a support shaft extending in the direction of the hinge axis and formed in the hinge housing, the hinge member being coupled to the hinge housing in a state where the support shaft is enclosed by the guide shaft.

In one aspect, the elastic member is a torsion spring wound to enclose the guide shaft, an end of the elastic member being supported by the hinge housing and another end of the elastic member being supported by the hinge member.

The hinge apparatus may further include an engagement member fixed to the guide shaft and supported by the hinge housing to bind the hinge member to the hinge housing and a second elastic member received in the guide shaft and wound to enclose the support shaft, in which an end of the second elastic member is supported by the engagement member and another end of the second elastic member is supported by an inner wall of the guide shaft such that the second elastic member provides an elastic member for urging the hinge member to contact the hinge housing.

The hinge apparatus may further include a guide member fixed to the hinge member and a guide recess formed in an inner wall of the hinge housing, in which as the hinge member rotates, the guide member moves along an inner wall of the guide recess while turning around the hinge axis.

As the guide member is interfered by both end walls of the guide recess, a rotation range of the hinge member is limited.

The hinge housing may include a cylindrical housing portion extending along the hinge axis and a first coupling portion extending perpendicularly to the hinge axis and being formed at an end of the housing portion, and the hinge member may include a cylindrical guide shaft extending along the hinge axis and being received in the cylindrical housing portion and a second coupling portion formed at an end of the guide shaft to face the first coupling portion.

The interference protrusion may be formed on a surface of the first coupling portion facing the second coupling portion, and the stopper groove may be formed in a surface of the second coupling portion facing the first coupling portion.

The interference protrusion and the stopper groove may be formed in pairs at intervals of 180 degrees. A plurality of interference protrusions and a plurality of stopper grooves preferably formed at equiangular intervals along a circumference of the housing portion.

The interference protrusion may be provided to protrude from a surface of the first coupling portion facing the second coupling portion, and the stopper groove may be formed in a surface of the second coupling portion facing the first coupling portion.

The hinge apparatus may further include a support member fixed to another surface of the first coupling portion, a third elastic member received in the support member, and a reciprocating member received in the support member to be provided from the third elastic member with an elastic member acting in a direction urging the reciprocating member to protrude from the support member, the interference protrusion being formed at an end of the reciprocating member.

The hinge apparatus may further include a receiving hole formed to penetrate both surfaces of the first coupling portion and an assembling slit extending from a lateral end of the first coupling portion to the receiving hole, in which as a part of the reciprocating member is assembled in the receiving hole through the assembling slit, the interference protrusion is disposed on a surface of the first coupling portion.

The hinge apparatus may further include a first stepped surface provided in the receiving hole, and as the interference protrusion is interfered by the first stepped surface and another part of the reciprocating member is interfered by another surface of the first coupling portion, the reciprocating member in a state coupled to the first coupling portion performs a straight-line reciprocating movement along the hinge axis within a limited range.

The stopper groove may be formed to penetrate both surfaces of the second coupling portion, the hinge apparatus may further include a second stepped surface provided on an inner wall of a side of the stopper groove and an inclined member provided at another side of the stopper groove, and a part of the interference protrusion may be positioned on the second stepped surface when the first housing and the second housing overlap each other.

As the second stepped surface is interfered by the reciprocating member and the interference protrusion, rotation of the hinge member in a first direction may be limited, and upon rotation of the hinge member in a second direction, the inclined member presses the interference protrusion and thus the reciprocating member moves back into the support member and the interference protrusion moves into the receiving hole. The interference protrusion may include a curved surface at a portion contacting the inclined member.

The interference protrusion may be provided at a side of the housing portion and the stopper groove may be provided at both sides of the guide shaft.

The hinge apparatus is structured such that the housings of the portable terminal are coupled to rotate while facing each other and the housings secure a predetermined interval therebetween during rotation of the housings, thereby preventing damage to the exteriors of the housings due to a scratch or the like. Moreover, by forming the interference protrusion for securing the predetermined interval between the housings during rotation of the housings and the stopper grooves engaged with the interference protrusion, the housings can maintain a stable fixed state when overlapping each other or being rotated away from each other. Furthermore, if the elastic member for providing a rotation force is installed in the hinge apparatus coupling the housings, the housings can be more conveniently opened and closed.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION OF THE INVENTION

Exemplary embodiments of the present invention will be described in detail with reference to the accompanying drawings. In the following description, a detailed description of known functions and configurations incorporated herein will be omitted when it may obscure the subject matter of the present invention.

Figure 1:
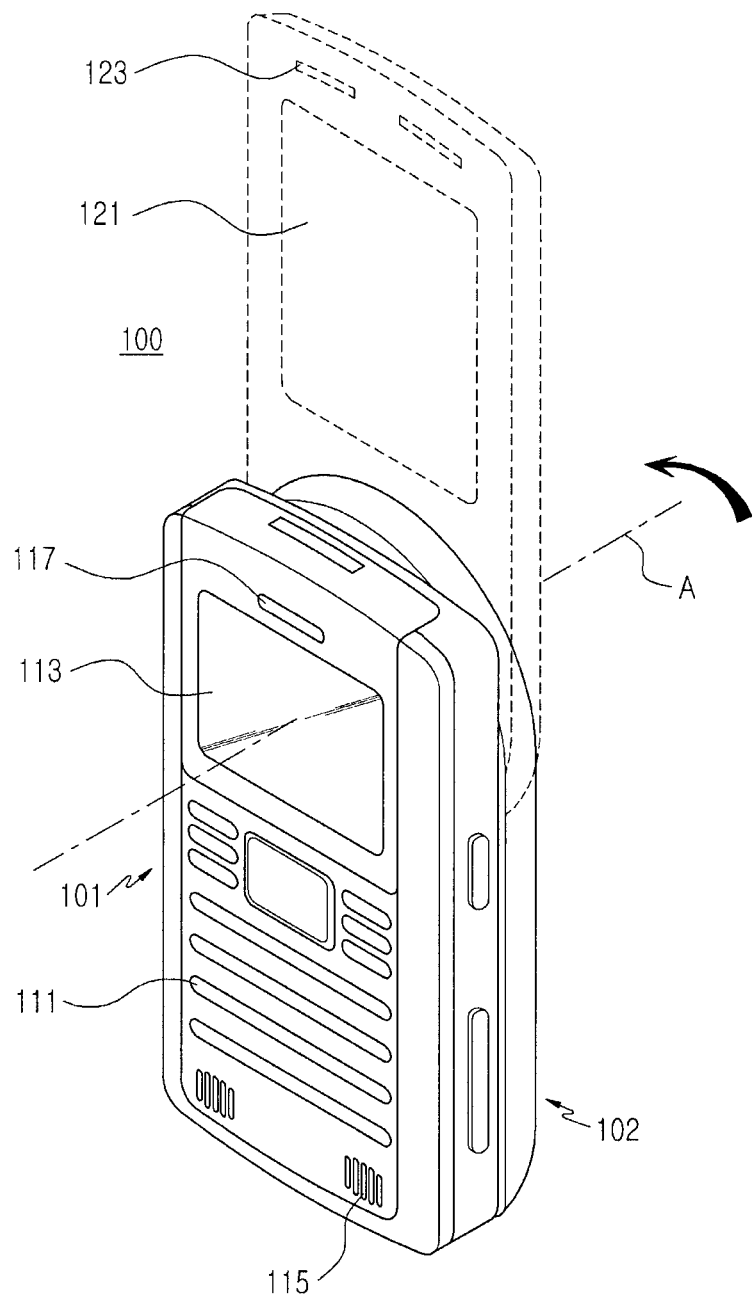
FIG. 1 is a perspective view of a portable terminal including a hinge apparatus according to an embodiment of the present invention.

FIG. 1 is a perspective view of a portable terminal 100 according to an embodiment of the present invention. As shown in FIG. 1, the portable terminal 100 includes a first housing 101 and a second housing 102 which are coupled to rotate while facing each other. A large-size display device 121 is installed in the second housing 102 such that a user can use a multimedia function such as moving picture watching by opening the second housing 102.

The first housing 101 includes a keypad 111 and a transmitting unit 115 (or mouthpiece) as input devices and a display device 113 and a receiving unit 117 (or earpiece) as output devices on a surface thereof. When the second housing 102 overlaps the first housing 101, the user may use a basic mobile communication service provided by the portable terminal 100, for example, voice communication or short message transmission, by using the first housing 101. In other words, since the keypad 111, the transmitting unit 115, and the receiving unit 117 capable of providing a mobile communication function are installed in the first housing 101, the user can use the mobile communication service by using only the first housing 101.

The second housing 102 is coupled to the first housing 101 such that it can rotate around a hinge axis A, which extends perpendicularly to a surface or another surface of the first housing 101, while facing the another surface of the first housing 101. The hinge axis A is provided to pass through an upper portion of the first housing 101. The second housing 102 rotates around the hinge axis A such that the second housing 102 can move from a position overlapping the first housing 101 to a position protruding from the top end of the first housing 101.

The large-size display device 121 is installed in the second housing 102 to allow the user to use a multimedia function such as watching of broadcasting programs or moving pictures. A separate speaker device 123 may be preferably installed in the second housing 102 to output sound when the multimedia function is used. This is because a speaker phone of the receiving unit 117 installed for voice communication or the like may not provide high-quality sound for music appreciation or the multimedia function.

While the keypad 111 and the display device 113 are installed in the first housing 101 in an embodiment of the present invention, it should be noted that a hinge apparatus 200 to be described below may also be installed in a device where a pair of housings are coupled to rotate while facing each other, regardless of input/output devices such as a keypad or a display device.

Figure 2:
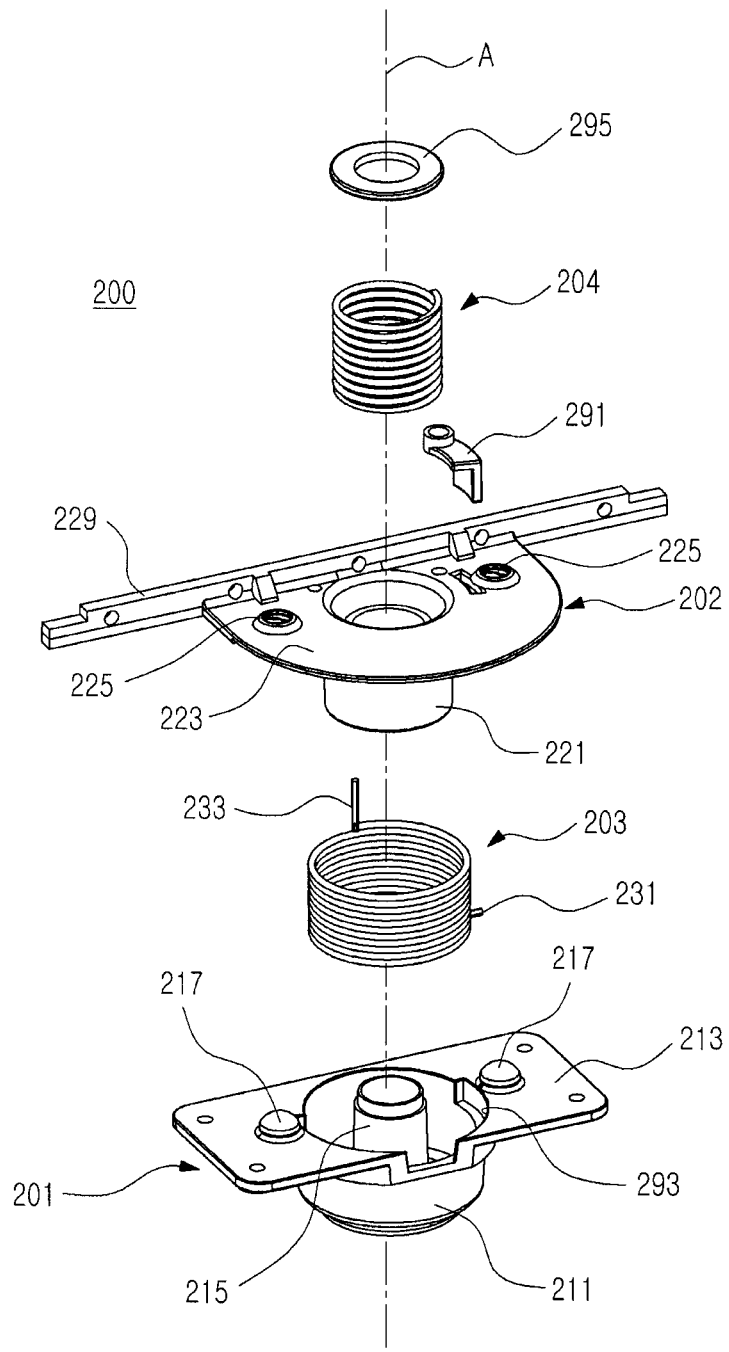
FIG. 2 is an exploded perspective view of a hinge apparatus according to a first embodiment of the present invention for the portable terminal shown in FIG. 1.
Figure 3:
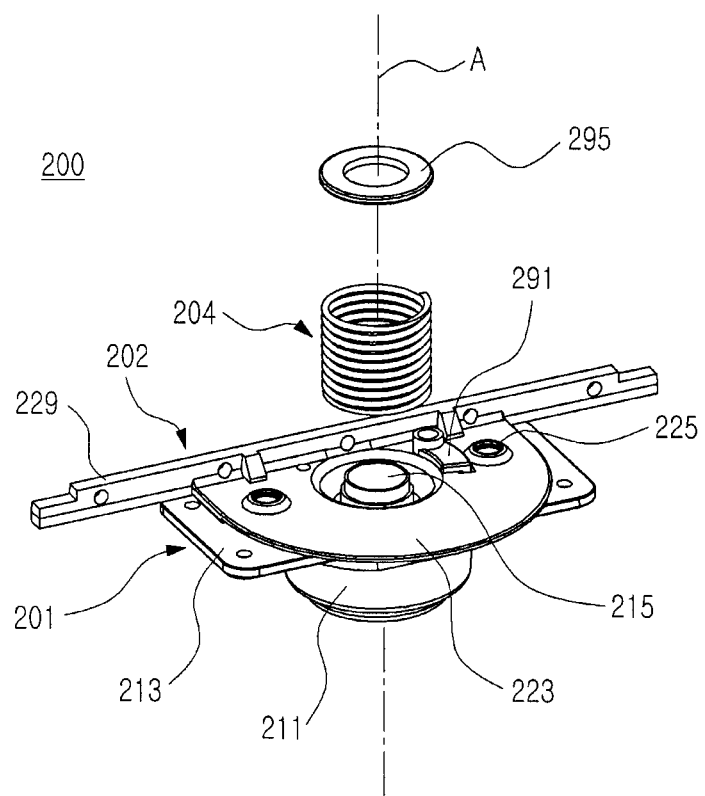
FIG. 3 is a partially-assembled perspective view of the hinge apparatus shown in FIG. 2.
Figure 4:
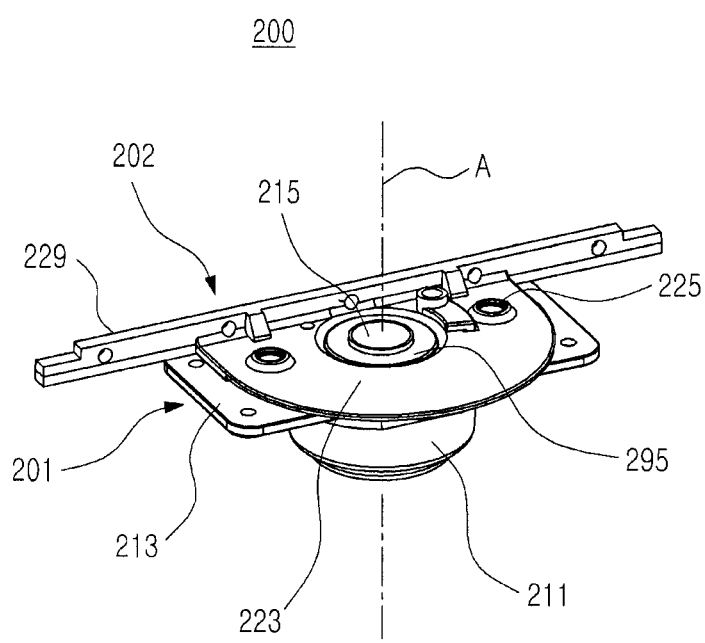
FIG. 4 is an assembled perspective view of the hinge apparatus shown in FIG. 2.

FIGS. 2 through 4 show the hinge apparatus 200 according to a first embodiment of the present invention for the portable terminal 100 shown in FIG. 1.

As shown in FIGS. 2 through 4, the hinge apparatus 200 installed in the portable terminal 100 includes a hinge housing 201, a hinge member 202, and an elastic member 203. Interference protrusions 217 are formed on the hinge housing 201 and stopper grooves 225 are formed in the hinge member 202. The interference protrusions 217 and the stopper grooves 225 maintain the stop state of the hinge member 202 and permit a predetermined interval between the hinge member 202 and the hinge housing 201 during rotation of the hinge member 202. Consequently, the stop state of the second housing 102 is stably maintained and an interval between the second housing 102 and the first housing 101 is maintained constant during rotation of the second housing 102.

The interference protrusions 217 may also be formed on the hinge member 202 and the stopper grooves 225 may also be formed in the hinge housing 201, but such a configuration can be easily understood by those of ordinary skill in the art and thus will not be described for brevity.

The hinge housing 201 includes a housing portion 211 in a cylindrical shape extending along the hinge axis A and a first coupling portion 213 extending outwardly from an end of the housing portion 211 in a radius direction of the housing portion 211, that is, in a direction perpendicular to the hinge axis A. The housing portion 211 includes a support shaft 215, which extends from a bottom wall of housing portion 211, i.e., an inner space bottom of the housing portion 211 shown in FIG. 2 along the hinge axis A. In an inner wall of the housing portion 211 is provided a guide recess 293 extending along the circumferential direction of the housing portion 211. The interference protrusions 217 are formed on the hinge housing 201, more specifically, on a surface of the first coupling portion 213 to protrude toward the hinge member 202.

The hinge housing 201 structured as described above is fixed to one of the first housing 101 and the second housing 102. In the current embodiment, it is assumed that the hinge housing 201 is fixed to the first housing 101. To fix the hinge housing 201, a screw engaged with the first housing 101 through the first coupling portion 213 is used.

Figure 5:
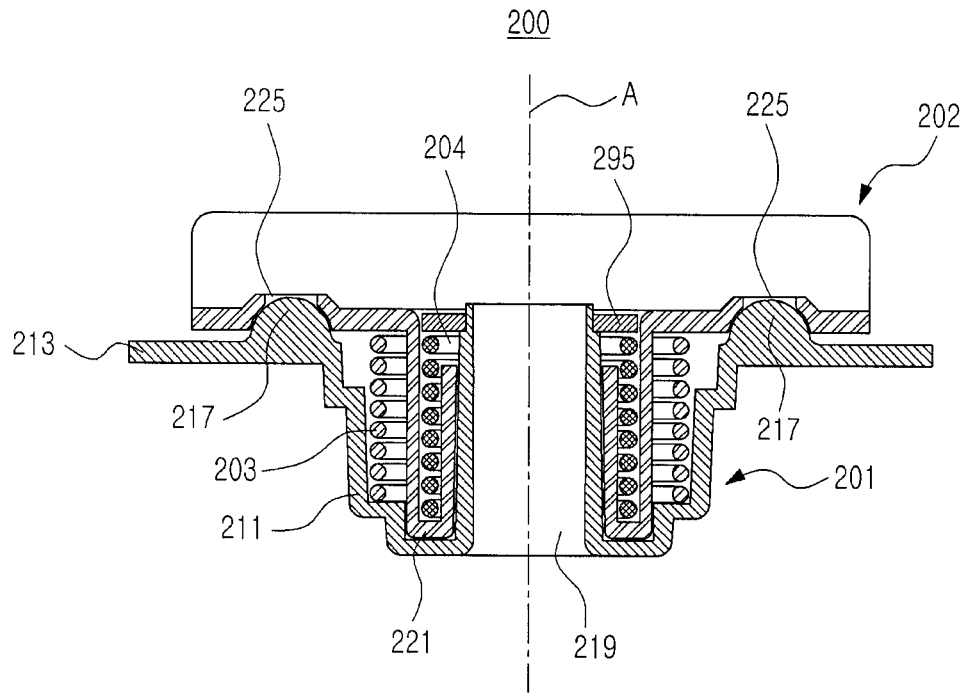
FIG. 5 is a cross-sectional view of the hinge apparatus shown in FIG. 2 when a first housing and a second housing of the portable terminal shown in FIG. 1 overlap each other.

Referring to FIG. 5, in the support shaft 215 is formed a through-hole 219 extending along the hinge axis A. A flexible printed circuit extending from the first housing 101 to the second housing 102 is wired via the through-hole 219 (not shown).

The hinge member 202 includes a guide shaft 221 extending along the hinge axis A and a second coupling portion 223 (see FIG. 3) extending outwardly from an end of the guide shaft 221 in a radius direction of the guide shaft 221. As can be easily understood by those of ordinary skill in the art, the radius direction of the guide shaft 221 is perpendicular to the hinge axis A. The hinge member 202 is coupled to the hinge housing 201 and rotates around the hinge axis A. The guide shaft 221 encloses the support shaft 215 while being accommodated in the housing portion 211. That is, the guide shaft 221 rotates around the hinge axis A while enclosing the support shaft 215. Once the hinge member 202 is coupled to the hinge housing 201, the support shaft 215 passes through the guide shaft 221, after which an engagement member 295 such as a C-ring, an E-ring, or an O-ring, is coupled to an end portion of the support shaft 215. Hence, the hinge member 202 is bound to the hinge housing 201 in such a way as not to be separated from the hinge housing 201.

The stopper grooves 225 are formed in the hinge member 202, more specifically, in a surface of the second coupling portion 223 facing the first coupling portion 213, such that the stopper grooves 225 are exposed toward the first coupling portion 213. It should be noted that the stopper groove 225 is shown as protruding in FIG. 2 because FIG. 2 shows another surface of the second coupling portion 223. A distance between the interference protrusion 217 and the hinge axis A is equal to a distance between the stopper groove 225 and the hinge axis A. That is, if the hinge member 202 rotates 360 degrees with respect to the hinge housing 201, the interference protrusions 217 and the stopper grooves 225 face each other or are engaged with each other at least once.

In the current embodiment, pairs of the interference protrusion 217 and the stopper groove 225 are formed with an interval of 180 degrees therebetween. Thus, if the hinge member 202 rotates 360 degrees with respect to the hinge housing 201, the interference protrusion 217 is engaged with another stopper groove 225 when the hinge member 202 rotates 180 degrees from a position where the interference protrusion 217 is engaged with the original stopper groove 225, and the interference protrusion 217 is engaged with the original stopper groove 225 when the hinge member 202 rotates 360 degrees. That is, if the interference protrusions 217 and the stopper grooves 225 are formed in pairs, the interference protrusion 217 and the stopper groove 225 in each pair are engaged with each other at intervals of 180 degrees during rotation of the hinge member 202. One or more pairs of the interference protrusions 217 and the stopper grooves 225 may be formed. If two pairs of the interference protrusions 217 and the stopper grooves 225 are formed, the interference protrusions 217 and the stopper grooves 225 may be engaged at intervals of 90 degrees during rotation of the hinge member 202. That is, the interference protrusions 217 and the stopper grooves 225 may be formed at equiangular intervals along the circumference of the housing portion 211. During rotation around the hinge axis A, the rotation of the second housing 102 may be stopped at angular intervals at which the interference protrusions 217 and the stopper grooves 225 are formed.

The hinge member 202 includes a guide member 291 (see FIG. 2) provided to be removable. If the hinge member 202 is molded with molten metal or synthetic resin by die-casting or injection, the guide member 291 may be formed as one piece with the hinge member 202. The guide member 291 is coupled to the second coupling portion 223 such that a part thereof protrudes from a surface of the second coupling portion 223. Once the hinge member 202 is bound to the hinge housing 201, the guide member 291 is placed in the guide recess 293. Upon rotation of the hinge member 202, the guide member 291 moves along an inner wall of the guide recess 293 while turning around the hinge axis A. A rotation range of the hinge member 202 may be limited according to a range of an angle at which the guide recess 293 extends. In other words, a part of the guide member 291 moves along the inner wall of the guide recess 293 and cannot move any longer upon being interfered by either end walls of the guide recess 293. As to a structure for limiting a rotation range of the hinge member 202 and eventually of the second housing 102 by means of the guide member 291 and the guide recess 293, for example, if a part of the guide member 291 placed in the guide recess 293 has an angular width of about 10 degrees with respect to the hinge axis A, the hinge member 202 coupled to the hinge housing 201 can rotate in a range of 180 degrees when the guide recess 293 is formed with an angular width of 190 degrees.

In the current embodiment, the rotation range of the second housing 102 is limited to 180 degrees by using the guide recess 293 and the guide member 291.

The hinge member 202 is fixed to the other of the first housing 101 and the second housing 102. In the current embodiment, it is assumed that the hinge member 202 is fixed to the second housing 102. To fix the hinge member 202, a screw (not shown) engaged with the second housing 102 through the second coupling portion 223 is used. To fortify binding between the second housing 102 and the hinge member 202, a separate reinforcement member 229 may be further formed on the second coupling portion 223.

The elastic member 203 is received in the hinge housing 201, more specifically, in the housing portion 211, and is in a wound shape to enclose the guide shaft 221 when the hinge member 202 is coupled to the hinge housing 201. The elastic member 203 may include a torsion spring, an end 231 (see FIG. 2) of which is fixed to the inner wall of the housing portion 211 and another end 233 (see FIG. 2) of which is fixed to the hinge member 202. When the first housing 101 and the second housing 102 overlap each other, an elastic member provided by the elastic member 203 acts as a rotation force for rotating the second housing 102. That is, when the first housing 101 and the second housing 102 overlap each other, the elastic member 203 accumulates an elastic member and the accumulated elastic member works as a drive force for rotating the second housing 102 to urge the second housing 102 toward the top end of the first housing 101.

The hinge apparatus 200 may further include a second elastic member 204 (see FIG. 2) for providing an elastic member acting in a direction urging the hinge member 202 to contact the hinge housing 201. The second elastic member 204 may be a compression coil spring that is received in the guide shaft 221 and is wound to enclose the support shaft 215. An end of the second elastic member 204 is supported by the hinge member 202, more specifically, an end of the guide shaft 221, and another end of the second elastic member 204 is supported by the engagement member 295. Thus, the elastic member provided by the second elastic member 204 works in a direction urging the hinge member 202 to contact the hinge housing 201.

As shown in FIG. 5, the guide shaft 221 is in a bent shape, in the form of the letter "U", to accommodate the second elastic member 204. Although it has been described that the second elastic member 204 is in a shape to enclose the support shaft 215, the cross section of the guide shaft 221 may be in the letter "U" shape to accommodate at least a part of the second elastic member 204. This is because by leading the second elastic member 204 to be compressed along the hinge axis A, the elastic member accumulated in the second elastic member 204 works merely as a force urging the hinge member 202 and the hinge housing 201 to contact each other.

Once the hinge housing 201 fixed to the first housing 101 and the hinge member 202 to the second housing 102 are coupled to rotate while facing each other, the first housing 101 and the second housing 102 are also coupled to rotate while facing each other. As mentioned above, the elastic member 203 provides a drive force acting in a direction urging the second housing 102 to protrude from the top end of the first housing 101.

Figure 6:
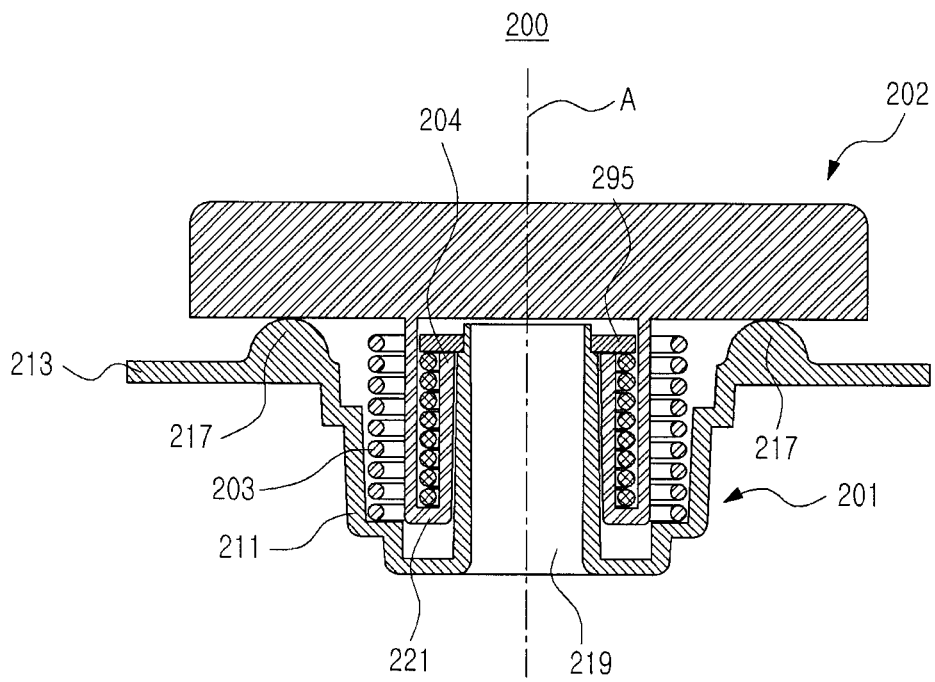
FIG. 6 is a cross-sectional view of the hinge apparatus shown in FIG. 2 when the second housing of the portable terminal shown in FIG. 1 rotates.

FIGS. 5 and 6 are views for describing operations of the hinge apparatus 200.

FIG. 5 shows the hinge apparatus 200 when the second housing 102 overlaps the first housing 101 as shown in FIG. 1) as represented by the solid line drawing of housing 102. At the position where the second housing 102 overlaps the first housing 101 (closed position), the hinge member 202 is at a position where the stopper grooves 225 and the interference protrusions 217 are engaged with each other. The elastic member 203 has accumulated a drive force for urging the second housing 102 to rotate and protrude from the top end of the first housing 101, as represented by the dashed line drawing of housing 102. However, the hinge member 202 maintains the contact with the hinge housing 201 by the elastic member provided by the second elastic member 204, which also acts as a force maintaining the engagement between the interference protrusions 217 and the stopper grooves 225. Therefore, although the elastic member 203 accumulates the drive force for rotating the second housing 102, the second housing 102 can be kept in a state of overlapping the first housing 101.

Once the second housing 102 is rotated to urge the second housing 102 to protrude from the top end of the first housing 101, the stopper groove 225 is moved as the hinge member 202 rotates with respect to the hinge housing 201. Thus, the interference protrusions 217 leave the stopper grooves 225 and thus rub against the second coupling portion 223, such that the first coupling portion 213 and the second coupling portion 223 are spaced apart from each other by a height of the interference protrusions 217 as shown in FIG. 6. Since the hinge housing 201 is fixed to the first housing 101 and the second housing 102 is fixed to the hinge member 202, the second housing 102 is spaced apart from the first housing 101 as the first coupling portion 213 and the second coupling portion 223 are spaced apart from each other (open position)

Once the interference protrusions 217 leave the corresponding stopper grooves 225, the elastic member of the elastic member 203 works to rotate the second housing 102 in a direction to cause the second housing 102 to protrude from the top end of the first housing 101. The interference protrusions 217 generate a frictional force in contact with the second coupling portion 223, thereby preventing a sharp change in the rotation speed of the second housing 102 and thus smoothly rotating the second housing 102.

As previously mentioned, in the current embodiment, the interference protrusions 217 and the stopper grooves 225 are formed in pairs at intervals of 180 degrees. Therefore, the second housing 102 contacts the first housing 101 when overlapping the first housing 101 or protruding from the top end of the first housing 101, and is spaced apart from the first housing 101 by a height of the interference protrusions 217 when rotating in other positions.

The part of the guide member 291 moves in the guide recess 293. When the second housing 102 overlaps the first housing 101 or protrudes from the top end of the first housing 101, the part of the guide member 291 is interfered by one of the both end walls of the guide recess 293 and, thus, the second housing 102 can rotate in a range of 180 degrees.

When the second housing 102 rotates 180 degrees from a position overlapping the first housing 101, and thus is at a position protruding from the top end of the first housing 101 the hinge apparatus 200 maintains the same state as shown in FIG. 5.

Figure 7:
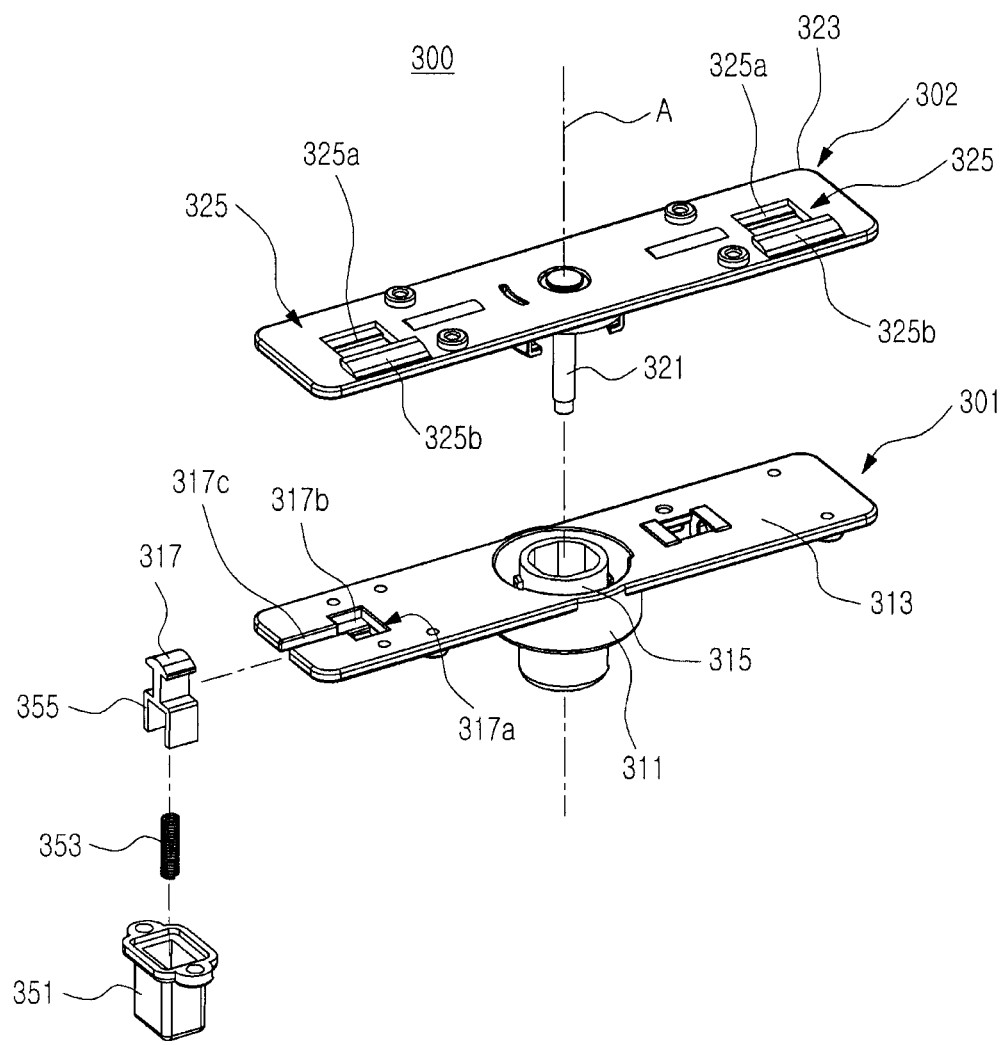
FIG. 7 is a disassembled perspective view of a hinge apparatus according to a second embodiment of the present invention for the portable terminal shown in FIG. 1.
Figure 8:
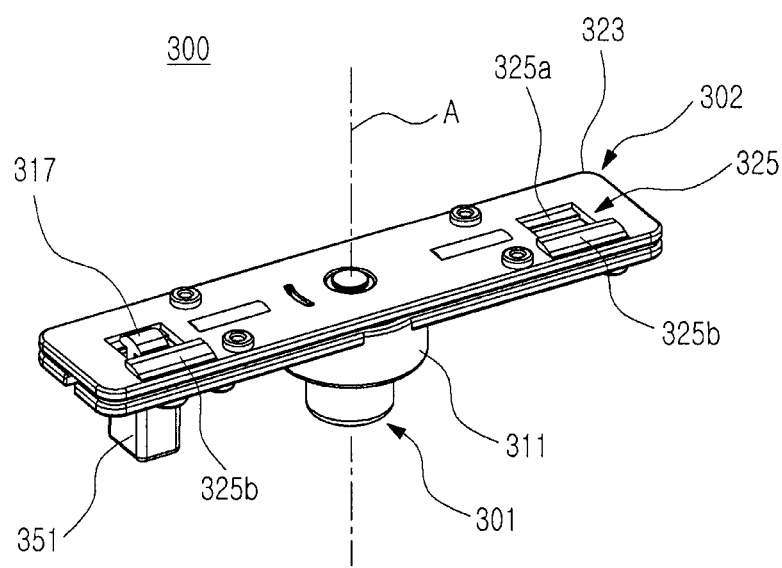
FIG. 8 is an assembled perspective view of the hinge apparatus shown in FIG. 7.

FIGS. 7 and 8 show a hinge apparatus 300 according to a second embodiment of the present invention for the portable terminal 100 shown in FIG. 1. The hinge apparatus 300 may be structured in the same manner as the hinge apparatus 200 according to the first embodiment except for an interference protrusion 317 and stopper grooves 325. Although a support shaft used in the first embodiment is formed in a hinge member 302 and a guide shaft used in the first embodiment is provided in a hinge housing 301 in the current embodiment, such a structure can be easily understood by those of ordinary skill in the art from that of the first embodiment.

Accordingly, it should be noted that elements of the structure described with regard to the first embodiment of the invention claimed are applicable to the second embodiment of the invention and need not be described in detail in the following description regarding the second embodiment.

As shown in FIGS. 7 and 8, the hinge apparatus 300 according to the current embodiment includes the hinge housing 301 and the hinge member 302, and the interference protrusion 317 installed in the hinge housing 301 that can protrude from the first coupling portion 313 of the hinge housing 301.

The hinge housing 301 includes a housing portion 311 and the first coupling portion 313 extending from an end of the housing portion 311 in the radius direction of the housing portion 311. The interference protrusion 317 is installed in a receiving hole 317a formed to penetrate both surfaces of the first coupling portion 313. A guide shaft 315 is formed on a bottom surface of the housing portion 311, and when a support shaft 321 formed on a surface of the hinge member 302 passes through the guide shaft 315, an engagement member (not shown) is engaged with the support shaft 321, such that the hinge member 302 is bound to the hinge housing 301. An elastic member and a second elastic member used in the first embodiment may also be installed in the hinge apparatus 300 according to the current embodiment. Thus, such an installation structure need not be described in detail with regard to this embodiment of the invention. However, in one aspect of the current embodiment of the invention, an elastic member for providing a rotation force need not be installed in the hinge apparatus 300 according to the current embodiment, as will be described in more detail with reference to FIGS. 9 through 14.

To install the interference protrusion 317, the hinge apparatus 300 further includes a support member 351, a third elastic member 353, and a reciprocating member 355. The interference protrusion 317 is formed on an end of the reciprocating member 355. The support member 351 is mounted on an undersurface of the first coupling portion 313. Before the support member 351 is mounted on the underside surface of the first coupling portion 313, the third elastic member 353 and the reciprocating member 355 are received in the support member 351. An end of the third elastic member 353 is supported by an inner wall of the support member 351 and another end thereof is supported by the reciprocating member 355, such that the third elastic member 353 provides an elastic member for urging the reciprocating member 355 to protrude from the support member 351. As mentioned previously, the interference protrusion 317 is formed on an end of the reciprocating member 355, preferably as one piece with the reciprocating member 355.

As described above, the receiving hole 317a perforating both surfaces of the first coupling portion 313 is formed in the first coupling portion 313, and the interference protrusion 317 protrudes from a surface of the first coupling portion 313 and the support member 351 is mounted on an underside (another) surface of the first coupling portion 313. A first stepped surface 317b is formed in the receiving hole 317a. The interference protrusion 317, when being positioned on the receiving hole 317a, cannot move to the outside of the receiving hole 317a because of being interfered by the first stepped surface 317b. The reciprocating member 355 is provided with an elastic member acting in a direction urging the reciprocating member 355 to protrude from the support member 351, such that the interference protrusion 317 tends to protrude from a surface of the first coupling portion 313.

When the interference protrusion 317 protrudes from a surface of the first coupling portion 313 by a predetermined height, a part of the reciprocating member 355 is interfered by another surface of the first coupling portion 313, such that the interference protrusion 317 cannot further protrude from the predetermined-height position. However, if the hinge apparatus 300 is installed in the portable terminal 100 and the interference protrusion 317 is interfered by another structure, the interference protrusion 317 may not protrude by the predetermined height even if the reciprocating member 355 is not directly interfered by another surface of the first coupling portion 313.

As such, since the interference protrusion 317 is interfered by a surface of the first coupling portion 313, more specifically, by the first stepped surface 317b, and the reciprocating member 355 is interfered by another surface of the first coupling portion 313, the hinge apparatus 300 preferably includes an assembling slit 317c to perform assembling in such a way that the interference protrusion 317 is positioned on the receiving hole 317a. The assembling slit 317c extends from a lateral end of the first coupling portion 313 to the receiving hole 317a. As another part of the reciprocating member 355 moves to the receiving hole 317a along the assembling slit 317c, the interference protrusion 317 is positioned on the receiving hole 317a on a surface of the first coupling portion 313 and a part of the reciprocating member 355 is positioned in a position corresponding to the receiving hole 317a on another surface of the first coupling portion 313.

The stopper groove 325 is formed to penetrate both surfaces of the second coupling portion 323 of the hinge member 302. Preferably, the width of the stopper groove 325 is sufficiently large to allow the interference protrusion 317 to pass through the stopper groove 325. The stopper groove 325 is preferably formed at both sides of the support shaft 321, and upon rotation of the hinge member 302, the interference protrusion 317 is engaged with the stopper groove 325 at intervals of 180 degrees.

A second stepped surface 325a is formed on an inner wall of a side of the stopper groove 325 and an inclined member 325b is provided at another side of the stopper groove 325. Upon rotation of the hinge member 302, the inclined member 325b presses the interference protrusion 317 such that the interference protrusion 317 and the reciprocating member 355 move back into the support member 351. During rotation of the hinge member 302, the interference protrusion 317 leaves the stopper groove 325, while contacting and rubbing against the second coupling portion 323, by means of an elastic member provided by the third elastic member 353.

The structure and operation of the interference protrusion 317 and the stopper grooves 325 will be described in more detail with reference to FIGS. 9 through 14.

FIGS. 9 through 14 sequentially show states of the hinge apparatus 300 in a process where the second housing 102 rotates from a position overlapping the first housing 101 and thus protrudes from the top end of the first housing 101.

Figure 9:
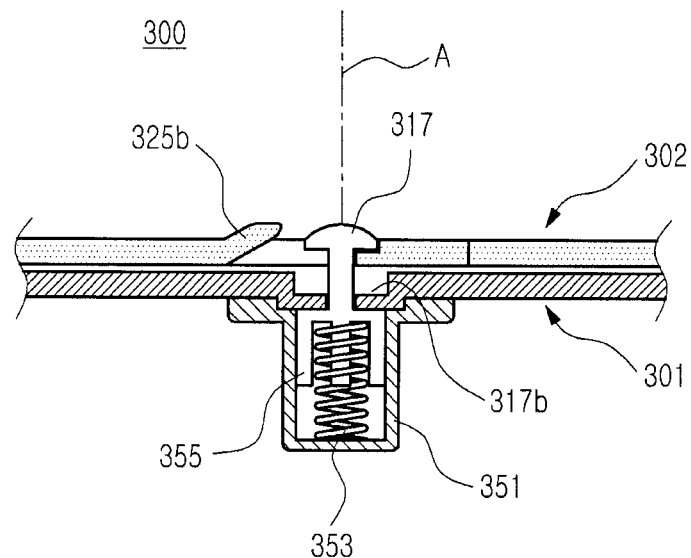
FIGS. 9 through 14 are cross-sectional views for sequentially showing operations of the hinge apparatus shown in FIG. 7 when the second housing of the portable terminal shown in FIG. 1 rotates 180 degrees from a position overlapping the first housing.

FIG. 9 shows a state of the hinge apparatus 300 when the second housing 102 overlaps the first housing 101. In this state, the interference protrusion 317 is engaged with the stopper groove 325. At this time, the second stepped surface 325a is interfered by the interference protrusion 317 or the reciprocating member 355. Thus, the hinge member 302 cannot further rotate in a direction in which the second stepped surface 325a is interfered by the interference protrusion 317 or the reciprocating member 355 (which will be referred to as a first direction) and can rotate only in a direction urging the second stepped surface 325a away from the interference protrusion 317 and the reciprocating member 355 (which will be referred to as a second direction).

Figure 10:
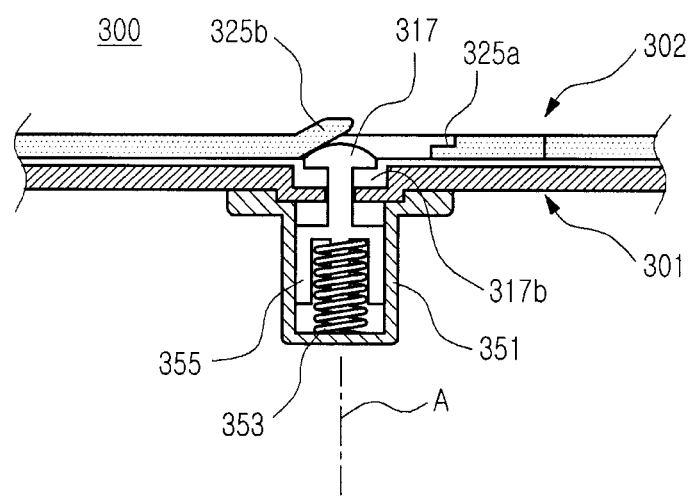

Referring to FIG. 10, if the second housing 102 and the hinge member 302 start rotating in the second direction from a state where the first housing 101 and the second housing 102 overlap, the inclined member 325b gradually presses the interference protrusion 317. As the second stepped surface 325a is urged away from the interference protrusion 317 and the reciprocating member 355, the interference protrusion 317 leaves from the stopper groove 325 and gradually moves in a direction to be received in the receiving hole 317a and the reciprocating member 355 gradually moves in a direction to be received in the support member 351.

It can be seen from FIGS. 9 and 10 that the inclined member 325b presses the interference protrusion 317 by means of the shape of the inclined member 325b and rotation of the hinge member 302. To facilitate rotation of the hinge member 302, the interference protrusion 317 preferably has a curved surface in a portion contacting and rubbing against the inclined member 325b.

Figure 11:
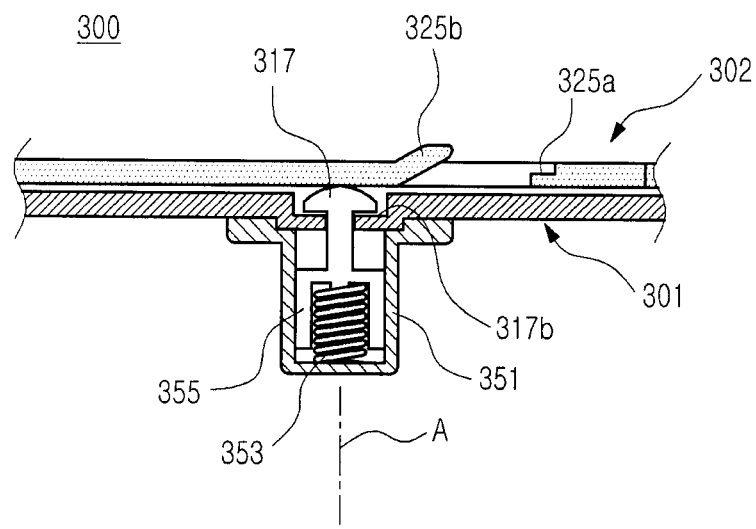

As shown in FIG. 11, once the interference protrusion 317 completely leaves from the stopper groove 325, it is positioned in the receiving hole 317a and the elastic member provided by the third elastic member 353 acts in a direction urging the interference protrusion 317 to protrude from a surface of the first coupling portion 313. Consequently, the interference protrusion 317 keeps contacting a surface of the second coupling portion 323 and provides a frictional force during rotation of the hinge member 302. Further, the protrusion 317 maintains a separation between the first and second housings.

Figure 12:
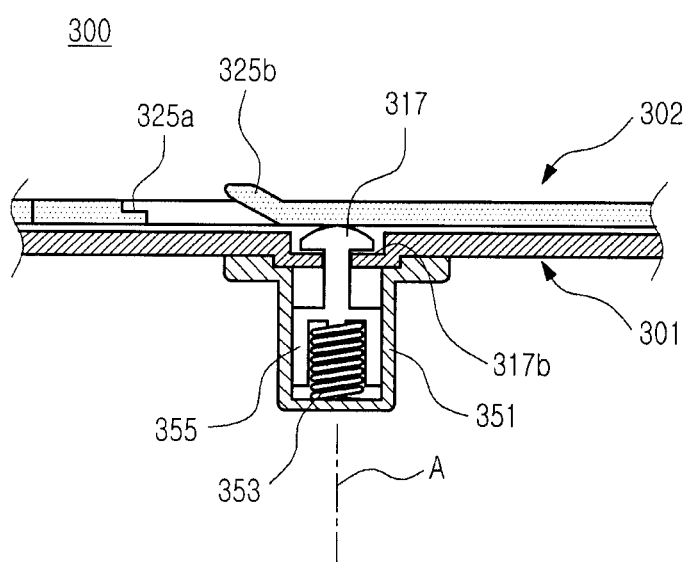

FIG. 12 shows a state of the hinge apparatus 300 when the second housing 102 rotates, thus going near a 180-degree rotation position from a position overlapping the first housing 101. If the interference protrusion 317 does not arrive at a position facing the stopper groove 325 in spite of rotation of the second housing 102, the interference protrusion 317 is still in contact with the second coupling portion 323.

Figure 13:
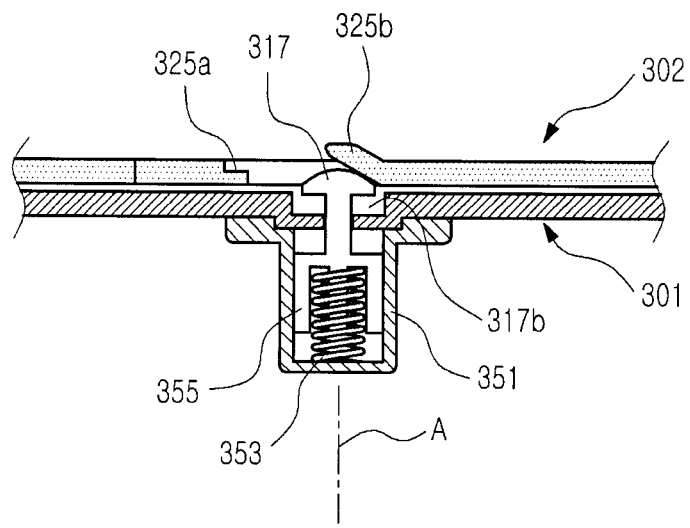
Figure 14:
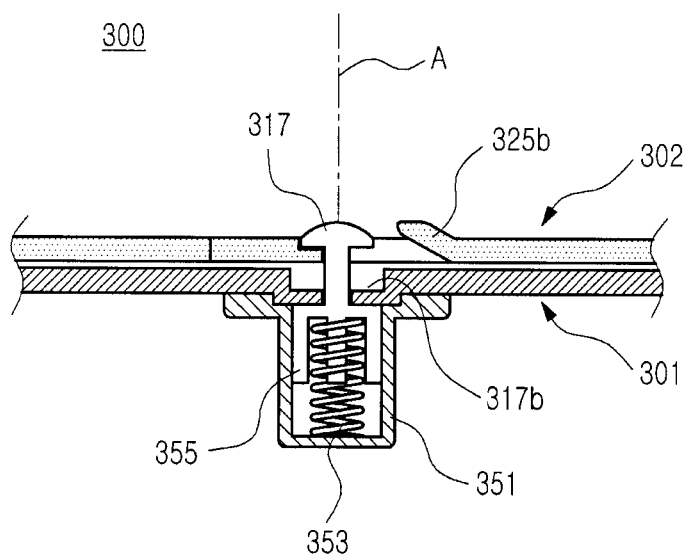

FIGS. 13 and 14 show a state where the interference protrusion 317 gradually enters the stopper groove 325 and thus is completely engaged with the stopper groove 325 when the second housing 102 is at the 180-degree rotation position.

When the interference protrusion 317 arrives at the position facing the stopper groove 325 by rotation of the hinge member 302, the interference protrusion 317 gradually enters the stopper groove 325 while rubbing against the inclined member 325b. If the hinge member 302 further rotates even after the interference protrusion 317 completely enters the stopper groove 325, the second stepped surface 325a is interfered by the interference protrusion 317 or the reciprocating member 355, thus stopping rotation of the hinge member 302. A position where rotation of the hinge member 302 is stopped is a position where the second housing 102 rotates 180 degrees from a position overlapping the first housing 101, that is, a position where the second housing 102 protrudes from the top end of the first housing 101.

As is mentioned above, the hinge apparatus 300 according to the current embodiment may include the elastic member and the second elastic member of the first embodiment. However, if an elastic member for rotating the hinge member 302 in the second direction is provided in the state shown in FIG. 9, it may be difficult for the second housing 102 to keep overlapping the first housing 101. Accordingly, it may be desirable not to install an elastic member for providing a rotation force for rotating the hinge apparatus 300, eventually, for rotating the second housing 102.

Moreover, the second elastic member providing a force urging the hinge housing 301 and the hinge member 302 to contact each other provides a smaller elastic member than the third elastic member 353. Hence, when the first housing 101 and the second housing 102 overlap each other or the second housing 102 protrudes from the top end of the first housing 101, the hinge member 302 and the hinge housing 301 contact each other, thus preventing movement of the second housing 102. On the other hand, during rotation of the second housing 102, a predetermined interval can be secured between the first housing 101 and the second housing 102.

In other words, when the first housing 101 and the second housing 102 overlap each other or the second housing 102 protrudes from the top end of the first housing 101, the interference protrusion 317 is not substantially in direct contact with the hinge member 302 and thus the elastic member of the third elastic member 353 is not applied to the hinge member 302. For this reason, if the second elastic member for providing a force urging the hinge housing 301 and the hinge member 302 to contact each other is installed, only the elastic member of the second elastic member may be substantially applied between the hinge housing 301 and the hinge member 302 when the first housing 101 and the second housing 102 overlap each other or the second housing 102 protrudes from the top end of the first housing 101.

On the other hand, during rotation of the second housing 102, that is, during rotation of the hinge member 302 with respect to the hinge housing 301, the interference protrusion 317 rubs against the second coupling portion 323. In this state, the elastic member of the second elastic member for urging the hinge housing 301 and the hinge member 302 to contact each other and the elastic member of the third elastic member 353 for urging the first coupling portion 313 and the second coupling portion 323 away from each other. Therefore, to prevent direct friction with the first housing 101 during rotation of the second housing 102, the elastic member of the third elastic member 353 is preferably greater than that of the second elastic member.

While the present invention has been described with reference to the embodiments thereof, it will be obvious to those of ordinary skill in the art that various changes in form and details may be made therein without departing from the spirit and scope of the invention as defined by the appended claims.

What is claimed is:

1. A portable terminal comprising a first housing, a second housing coupled to the first housing to rotate while facing the first housing, and a hinge apparatus rotatably coupling the first housing and the second housing, the hinge apparatus comprising:
    a hinge housing having a first flat coupling portion and fixed to the first housing;
    a hinge member having a second flat coupling portion and fixed to the second housing and rotatable coupled to the hinge housing, the hinge member rotating around a hinge axis which extends perpendicular to a surface of the first housing, wherein the first flat coupling portion and the second flat coupling portion are parallel to one another;
    at least one interference protrusion provided on one of the hinge housing and the hinge member; and
    at least one stopper groove formed in the other of the hinge housing and the hinge member,
    wherein when the first housing overlaps the second housing in a predetermined alignment, the interference protrusion is engaged with the stopper groove; when the first housing and the second housing rotate out of the alignment, said interference protrusion is disengaged from the stopper groove and is interfered by the other of the hinge housing and the hinge member, such that the hinge member rotates around the hinge axis while being spaced apart from the hinge housing.

2. The portable terminal of claim 1, wherein the hinge apparatus further comprises an elastic member for providing a drive force for rotating the hinge member in a direction, having a first end fixed to an inner wall of the hinge housing and a second end fixed to the hinge member, wherein the second housing rotates in the direction of the drive force.

3. The portable terminal of claim 2, wherein the hinge apparatus further comprises:
    a hollow cylindrical guide shaft extending along the hinge axis and being formed in the hinge member; and
    a support shaft extending in the direction of the hinge axis and formed in the hinge housing,
    the hinge member being coupled to the hinge housing in a state where the support shaft is enclosed by the guide shaft.

4. The portable terminal of claim 3, wherein the elastic member is a torsion spring wound to enclose the guide shaft, the first end of the elastic member being supported by the hinge housing and the second end of the elastic member being supported by the hinge member.

5. The portable terminal of claim 3, wherein the hinge apparatus further comprises:
    an engagement member coupled to the support shaft and supported by the hinge member to bind the hinge member to the hinge housing; and
    a second elastic member received in the guide shaft and wound to enclose the support shaft, wherein
    an end of the second elastic member is supported by the engagement member and another end of the second elastic member is supported by an inner wall of the guide shaft such that the second elastic member provides an elastic member for urging the hinge member to contact the hinge housing.

6. The portable terminal of claim 2, wherein the hinge apparatus further comprising:
    a guide member fixed to the hinge member; and
    a guide recess formed in an inner wall of the hinge housing, wherein the guide member moves along an inner wall of the guide recess while the hinge member rotates around the hinge axis.

7. The portable terminal of claim 6, wherein said guide recess has two end walls, a rotation range of the hinge member relative to the hinge housing is limited by the interference of the guide member with the end walls of the guide recess.

8. The portable terminal of claim 1, wherein the hinge housing comprises:
    a cylindrical housing portion extending along the hinge axis; and
    the first flat coupling portion extending perpendicular to the hinge axis and being formed at an end of the housing portion, and
    the hinge member comprises:
    a cylindrical guide shaft extending along the hinge axis and being received in the cylindrical housing portion; and
    the second flat coupling portion formed at an end of the guide shaft to face the first coupling portion.

9. The portable terminal of claim 8, wherein the interference protrusion is formed on a surface of the first coupling portion facing the second coupling portion, and the stopper groove is formed in a surface of the second coupling portion facing the first coupling portion.

10. The portable terminal of claim 9, wherein the interference protrusion and the stopper groove are formed in pairs at intervals of 180 degrees around the hinge axis.

11. The portable terminal of claim 9, wherein a plurality of interference protrusions and a plurality of stopper grooves are formed at equiangular intervals around the hinge axis.

12. The portable terminal of claim 8, wherein the interference protrusion is provided to protrude from a surface of the first coupling portion facing the second coupling portion, and the stopper groove is formed in a surface of the second coupling portion facing the first coupling portion.

13. The portable terminal of claim 12, wherein the hinge apparatus further comprises:
    a support member fixed to another surface of the first coupling portion;
    an elastic member received in the support member; and
    a reciprocating member received in the support member such that said elastic member urges the reciprocating member to protrude from the support member,
    the interference protrusion being formed at an end of the reciprocation member.

14. The portable terminal of claim 13, wherein the hinge apparatus further comprises:
    a receiving hole formed to penetrate both surfaces of the first coupling portion; and
    an assembling slit extending from a lateral end of the first coupling portion to the receiving hole, wherein the interference protrusion is disposed
    in the receiving hole through the assembling slit.

15. The portable terminal of claim 14, wherein the hinge apparatus further comprises a first stepped surface provided in the receiving hole.

16. The portable terminal of claim 15, wherein the hinge apparatus further comprises a second stepped surface provided on an inner wall of a side of the stopper groove and an inclined member provided at another side of the stopper groove, and a part of the interference protrusion is positioned on the second stepped surface when the first housing and the second housing overlap each other, the stopper groove being formed to penetrate through the second coupling portion.

17. The portable terminal of claim 16, wherein as the second stepped surface is interfered by the reciprocating member and the interference protrusion, rotation of the hinge member in a first direction is limited, and
    upon rotation of the hinge member in an opposite second direction, the inclined member presses the interference protrusion, and thus the reciprocating member moves back into the support member and the interference protrusion moves into the receiving hole.

18. The portable terminal of claim 17, wherein the interference protrusion comprises a curved surface for contacting the inclined member.

19. The portable terminal of claim 8, wherein the interference protrusion is provided at a side of the housing portion and the stopper groove is provided at both sides of the guide shaft.

* * * * *